United States Patent [19]

Larson

[11] Patent Number: 5,115,590
[45] Date of Patent: May 26, 1992

[54] ADJUSTABLE BALANCE BOBBER

[75] Inventor: Raymond D. Larson, Waunakee, Wis.

[73] Assignee: Rayco U.S.A., Inc., Waunakee, Wis.

[21] Appl. No.: 683,341

[22] Filed: Apr. 10, 1991

Related U.S. Application Data

[63] Continuation-in-part of Ser. No. 462,078, Jan. 8, 1990, abandoned.

[51] Int. Cl.$^5$ ............................................. A01K 97/12
[52] U.S. Cl. ............................................. 43/17; 43/25
[58] Field of Search .................. 43/17, 17.5, 44.9, 24, 43/25

[56] References Cited

U.S. PATENT DOCUMENTS

| | | |
|---|---|---|
| 1,808,736 | 6/1931 | Hernke . |
| 2,496,090 | 1/1950 | Grohns . |
| 2,652,654 | 9/1953 | Bahn . |
| 2,804,277 | 8/1957 | Kinder . |
| 3,012,352 | 12/1961 | Logsdon . |
| 3,034,248 | 5/1962 | Williams ............... 43/24 |
| 3,058,249 | 10/1962 | Krusbe . |
| 3,060,616 | 10/1962 | Woodley . |
| 3,143,822 | 8/1964 | Schooley . |
| 3,307,287 | 3/1967 | Hafen . |
| 3,484,978 | 12/1969 | Nakashimna . |
| 3,962,812 | 6/1976 | Means et al. . |
| 4,043,070 | 8/1977 | Lamothe . |
| 4,505,063 | 3/1985 | Price et al. ............... 43/17 |
| 4,727,673 | 3/1988 | Dumar . |
| 4,829,697 | 5/1989 | Nakata . |

FOREIGN PATENT DOCUMENTS

| | | | |
|---|---|---|---|
| 1111642 | 11/1955 | France . | |
| 0873456 | 7/1961 | United Kingdom | 43/17 |
| 1286242 | 8/1972 | United Kingdom | 43/17 |

Primary Examiner—Richard K. Seidel
Assistant Examiner—James Miner
Attorney, Agent, or Firm—Lathrop & Clark

[57] ABSTRACT

An ice fishing bobber has an elongate cylindrical tube balance member adjustably positioned within a collar and pivotally mounted to the tip of a fishing pole. The bobber may be adjusted for the weight of various lures to balance the assembly in a substantially horizontal posiiton. A rigid hollow cylindrical member receives a centrally threaded fishing line and is attached beneath the balance member. The bobber may be adjusted by moving the tube within the collar and by removing or adding weights to the balance member to permit the use of a variety of lures of different weights with the bobber. Because of the accurate balance attained, a very sensitive bobber is created. A further embodiment of the invention employs two rigid tubes joined by a flexible tube. The first rigid tube is mounted to the tip of a guided fishing pole. A fishing line is threaded through the tubes and a lure attached. A fish pulling downward on the lure will cause the bobber to deflect downward thereby signaling a catch.

22 Claims, 9 Drawing Sheets

ADJUSTABLE BALANCE BOBBER

This is a continuation-in-part of application Ser. No. 07/462,078, filed Jan. 8, 1990 now abandoned.

Field of the Invention

The present invention relates generally to signalling devices for ice fishing, and in particular to adjustable balance devices for use with lures of differing weights.

BACKGROUND OF THE INVENTION

In ice fishing, specialized poles and rigs may be used to signal the taking of a lure by a fish. Poles are often used which rest on the ice, free of contact with the angler's hands. Some species of fish, for example Perch, may exert only minute forces on the fishing line when making contact. The force of the fish tugging on the line is often so faint as to produce an imperceptible movement of the fishing pole that, when the angler does not have the rod in his hands, goes unnoticed.

There are many tip-up and other signaling devices for ice-fishing, but these usually require a substantial force on the line to produce the signaling phenomenon, and often are not well suited for light-hitting panfish.

Free-standing tip-ups such as that disclosed in U.S. Pat. No. 1,808,736 employing spherical weights running freely in a central bore as a counterweight to the line and lure in the water are known to the art. Devices for indicating fish bites such as that disclosed in U.S. Pat. No. 3,058,249 which are mountable on a standard fishing pole are also known to the art. Because different lures and lengths of fishing line will have differing weights, to be useful in a variety of circumstances a counterbalanced signaling apparatus should be infinitely adjustable.

What is needed is a simple bite signal indicator for ice fishing which may be infinitely adjustably balanced and which is sensitive to low-intensity pulls by fish.

SUMMARY OF THE INVENTION

The preferred bobber for a fishing pole of this invention has a support adapted for snug attachment to the tip of the fishing pole. The support has at least one and preferably two upright opposing spaced members. An annular collar is pivotally mounted perpendicular to its axis between the upright members of the support. An elongate balance member which is preferably in the form of a cylindrical tube with a closed end and an open end is adjustably positioned concentricly within the collar. A tubular cap with a closed end is fit snugly and adjustably over the open end of the tube to form a closed tubular assembly with an internal cylindrical cavity of adjustable length. A substantially spherical weight is located within he cavity of the tubular assembly and is free to move therein to balance the assembly in a substantially horizontal position or to unbalance the assembly so that it assumes a vertically inclined position. A rigid hollow cylindrical member is attached to the tube beneath the closed end and is adapted to receive a centrally threaded fishing line.

The bobber may also have a light-emitting diode for signalling the angler that a fish has contacted the bait or lure. The diode may be mounted outside the closed end of the tube, with two leads passing through the closed end into the interior of the tube. A battery with two terminals has a first terminal electrically connected to one of the leads of the diode and is located adjacent the closed end of the tube. The spherical weight is electrically conductive and a first contact is electrically connected to the second terminal of the battery and a second contact is electrically connected to the second lead of the diode. The two terminals are positioned in the tube so that when the weight is at its closest proximity to the closed end of the tube the weight will touch both contacts and complete an electrical circuit lighting the diode.

A second embodiment of the bobber of this invention has a rigid cylindrical attachment tube adapted for attachment to the tip of a fishing pole. An elastic flexible normally cylindrical tube is snugly fitted over a portion of the attachment tube. A rigid cylindrical line tube is snugly yet adjustably fitted within the flexible tube in spaced relation to the rigid attachment tube so as to be in substantial alignment with the attachment tube when the flexible cylindrical tube is undeflected. The line tube has a coating of bright coloring applied. The assembly of the attachment tube, the flexible tube and the line tube is adapted to accept a fishing line through its center such that when a fish applies a downward force to the line the flexible tube will bend and the line tube will be disposed downwardly to signal that a fish has taken the line.

A third embodiment bobber for a fishing pole of this invention has a support adapted for snug attachment to the tip of the fishing pole. The support has a lower member having a plurality of holes allowing for the support to be mounted on the upper or lower end guide of the fishing pole by threading a threaded screw between the guide and the hole. Alternatively, an adapter tube is supplied which fits into a hole in he lower member for a hollow pole. The support has preferably two upright opposed spaced members joined at their upright ends by a connecting pin. An angular collar has hooks extending upwardly and is pivotally mounted on the connecting pin between the members of the support. The angular collar bears a lower opening into which a small cylindrical tube may be inserted which is adapted to receiving centrally threaded fishing line. An elongated balance member which is preferably in the form of a transparent, cylindrical tube is adjustably positioned concentrically within the collar. The cyclindrical tube is preferably a flourescent yellow color. A tubular rear-end cap having a forward and a rear compartment is adjustably and snuggly fitted over an end of the tube to form a tubular assembly with an internal cylindrical cavity of an adjustable length. The tubular rear-end cap has a forward and a rear compartment to accommodate split shot which can be added to these compartments to counterweight the use of a heavier fishing lure. Alternatively, additional tubular rear-end caps may be added by mating the forward compartment of one with the rear compartment of the other. Serial addition of the rear-end caps, each bearing a weight which allows for the bobber to increase weight for the use of a heavier fishing lure. A front end cap with a closed end is fitted snugly and adjustably over the other open end of the tube so that a closed tubular assembly is formed. The front end cap has a protruding extension therein bearing a hole. When the bobber is used with a hollow fishing pole, the protruding extension can be pointed downwardly. A small tube bearing a guided end cap can be fitted into the hole and the fishing line can be threaded through the hole and through the small tube and guided end cap outwardly. The small tube is preferably made of a bright colored plastic, preferably red in color. If a casting rod or spinning rod is used, the front end cap is positioned with the hole pointing upwardly and it is not used for threading the fishing line through. Instead the small tube bearing a guided end cap is inserted into the lower opening of the collar. The fishing line is threaded through the lower opening and through the small tube and guided end cap outwardly. A substantially spherical weight is located within the cavity of the tubular assembly and is free to move therein to balance the assembly in a substantially horizontal position or to balance the assembly so that it assumes a vertical line position. Alternatively, a glow stick is inserted within the cavity of the tubular assembly.

A fourth embodiment of the bobber of this invention has a rigid cylindrical attachment tube adapted for attachment to the tip of a fishing pole. For use with guided poles such as casting rods or spinning rods, a snap clip is snugly fitted over a portion of the attachment tube. Alternatively, where a hollow pole is used, the rigid attachment tube is slid directly onto the end of the pole or glued onto the end of the pole. A rigid cylindrical line tube is snugly and adjustably fitted within a flexible tube in spaced relation to the rigid attachment tube so as to be in substantial alignment with the attachment tube when the flexible cylindrical tube is undeflected. The line tube is formed of a bright colored plastic, preferably red. The snap clip is snapped onto the guided pole, line is threaded through the rigid cylindrical tube, the flexible tube and the rigid attachment tube. The assembly of the attachment tube, the flexible tube and the line tube is adapted to accept a fishing line through its center such that when a fish applies a downward force to the line, the flexible tube will bend and the tube line will be disposed downwardly to signal that a fish has been taken.

It is an object of this invention to provide a bobber which simply and reliably indicates that a fish has attacked a lure.

It is a further object of this invention to provide a device which provides a signal indicating a fish strike which is easily visible under daylight or nighttime fishing conditions.

It is another object of this invention to provide a bobber and device which can be used with many different weights of lures.

It is an additional object of this invention to provide a bobber and device which can be used with different types of fishing poles by simple manipulation and adjustment of the device.

It is yet another object of the present invention to provide a fishing bobber which can accommodate a variety of lures and which is sensitive to light-hitting fish.

Further objects, features, and advantages of the invention will be apparent from the following detailed description when taken in conjunction with the accompanying drawings.

DESCRIPTION OF THE PREFERRED EMBODIMENTS

Figure 1:
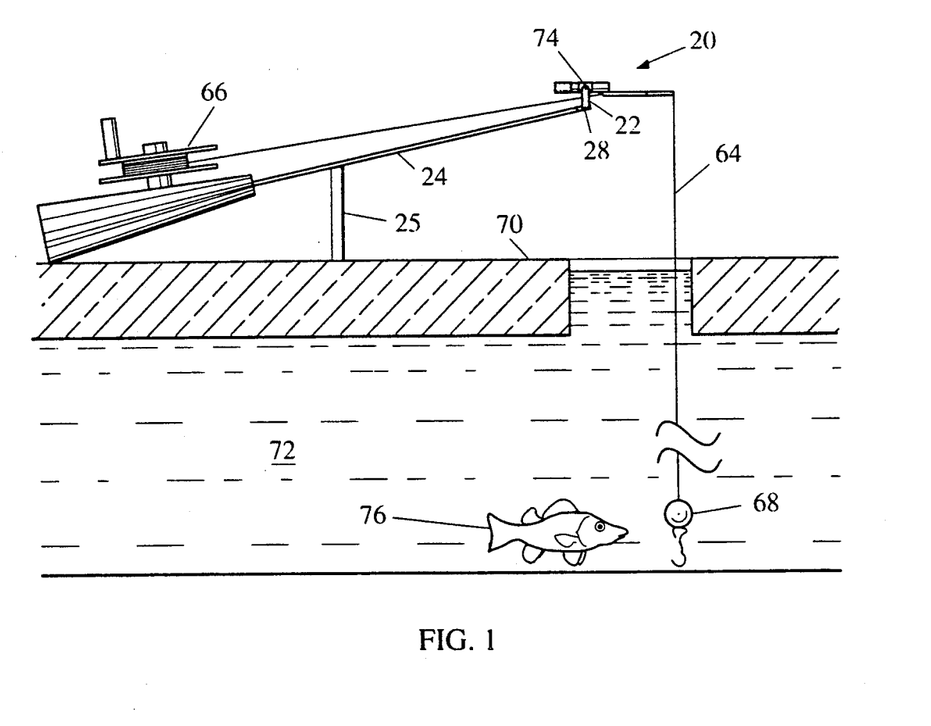
FIG. 1 is a side elevational view of a bobber of this invention mounted on a fishing pole with the line with lure attached extending into the water through a hole in the ice shown in section.
Figure 2:
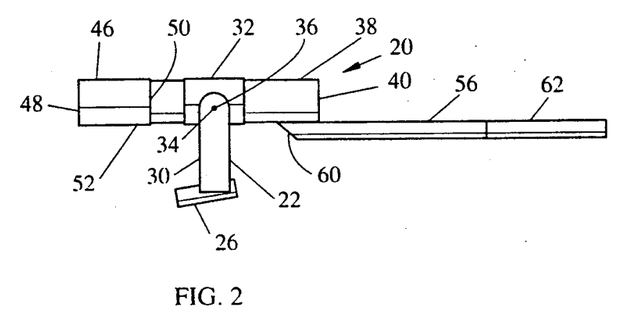
FIG. 2 is a side elevational view of a bobber of this invention.
Figure 3:
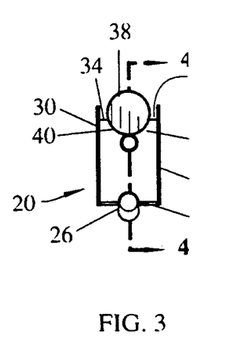
FIG. 3 is a front elevational view of the bobber of FIG. 2.

Referring now to FIGS. 1-20 wherein like numerals refer to similar parts the bobber 20 of FIGS. 1-6, and 12 has a support 22 for attachment of the bobber 20 to a conventional fishing pole 24. The fishing pole 24 may be hand held, or, as shown in FIG. 1, supported on the ice by a two-legged brace 25 which acts with the pole itself as a tripod base for the fishing apparatus comprised of the fishing pole 24 and the bobber 20. The support 22 has a tip mount 26 for attachment of the support to the tip 28 of the fishing pole 24. The tip mount 26 may be of any appropriate shape to snugly fit on the tip 28 of the fishing pole 24, but for the standard cylindrical fishing pole, the tip mount 26 is typically a cylindrical tube. The tip mount 26 fits on the tip 28 of the fishing pole 24 snugly, thereby fixedly attaching the support 22 to the fishing pole 24. The support 22 has two upright members 30 attached to the tip mount 26 on opposite sides. A collar 32 is pivotally mounted between the upright members 30 of the support 22.

The collar 32 which is preferably a thin metallic or plastic ring, is mounted between the upright members 30 by a pin or, as shown, by two pins 34 running perpendicular to the axis of the collar and rotating freely in holes 36 in the upright members 30.

Figure 4:
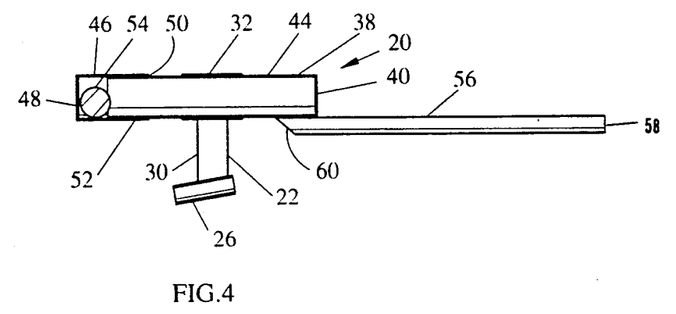
FIG. 4 is a cross-sectional view of the bobber of FIG. 3 taken along section line 4—4.
Figure 5:
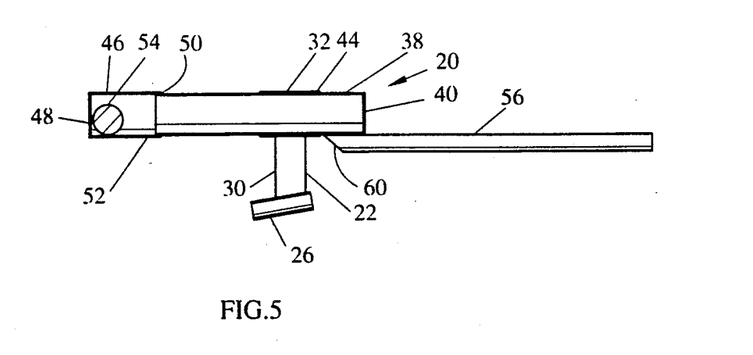
FIG. 5 is a cross-sectional view of the bobber of FIG. 2 with the cap drawn back.
Figure 6:
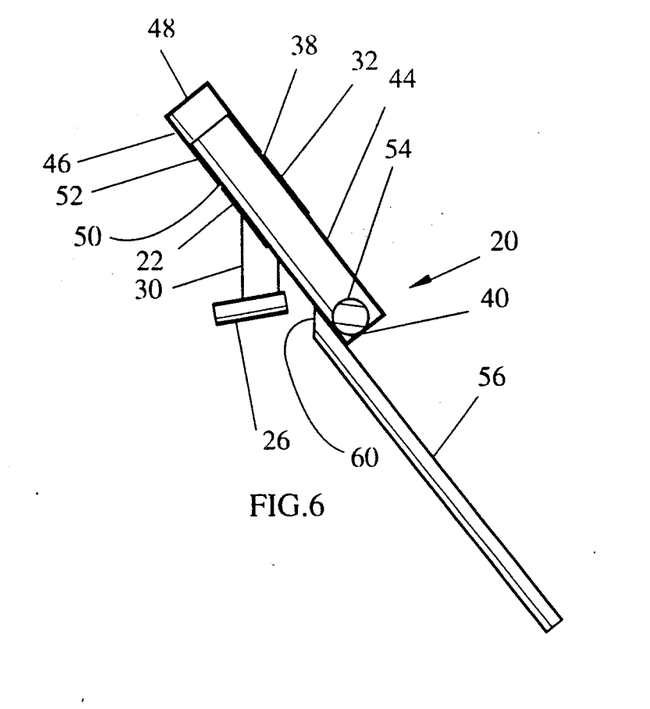
FIG. 6 is a cross-sectional view of the bobber of FIG. 2 in the signalling position.

The bobber 20 has an elongate balance member with a portion having an unvarying exterior profile. The balance member is preferably in the form of a cylindrical tube 38 and is positioned within the annular collar 32. The outer diameter of the tube 38 is slightly less than the inner diameter of the collar 32 so as to permit adjustable but snug positioning of the tube within the collar. The tube 38 is slidably positionable within the collar 32 which engages and retains the tube 38. The tube has one closed end 40 which faces towards the tip 28 of the fishing pole 24 and one open end 42 which faces away from the tip. The tube 38 is positioned concentrically within the collar 32. As shown in FIGS. 4-6 the hollow interior of the tube defines an internal cylindrical cavity which acts as a cylindrical linear race 44 for a rolling weight 54. A tubular cap 46 with a closed end 48 and an open end 50 fits snugly and removably over the tube 38 so that the closed end 48 of the cap 46 closes the open end 42 of the tube 38. The inner diameter of the cap 46 is dimensioned to be slightly larger than the outer diameter of the tube 38 so that the cap 46 may be adjustably positioned on the tube 38 as shown in FIGS. 4-6. The cap 46 and the tube 38 together form a closed tubular assembly 52 of adjustable length.

A dense, substantially spherical weight 54 runs in the race 44 of the tubular assembly 52. The weight 54 may be of any sufficiently dense material, such as steel, brass, or lead. As the length of the tubular assembly 52 is adjusted by drawing the cap 46 backwards along the tube 38 the race 44 will extend into the cylindrical interior of the cap 46.

A rigid hollow cylindrical member 56 is attached to the tube 38 beneath the closed end 40. The hollow member 56 is of smaller diameter than the tube 38 and has a central cavity 58 adapted to receive a centrally threaded fishing line 64. The hollow member 56 extends outward a specified distance from the tube 38 which may be any desirable length but is preferably on the order of 2 to 4 inches. To facilitate threading of the hollow member 56 an angled cutoff 60 is optionally provided at the entrance to the hollow member 56. A brightly colored, preferably fluorescent signal coating 62 may be applied to the extended end of the hollow member 56 to increase its visability.

As shown in FIG. 1 the bobber 20 is mounted on the tip 28 of the pole 24 with the tip 28 inserted into the tip mount 26 so that the tube 38 of the bobber 20 is located above the pole 24. A length of fishing line 64 is drawn from the reel 66, extended under the tube 38 and threaded through the hollow member 56. Once the line 64 is threaded through the bobber 20, the lure 68 may be attached to the end of the line 64 and the line dropped into a hole cut through the ice 70, as shown is FIG 1, so that the lure 68 will be suspended in the water 72 a desired distance beneath the ice 70.

The combined weight of the bobber 20, the lure 68, and portions of the fishing line 64 is supported by the pins 34 mounted in the holes 36 of the upright members 30 of the tip mount 26. If there is a balance between the weights forward and aft of the pivot point 74 the bobber will orient itself roughly horizontally and will be in a condition to effectively signal a bite on the lure 68.

The bobber 20 may be adjusted in two ways to obtain the desired balance. The tube 38 may be moved within the collar 32 and the cap 46 may be adjusted on the tube 38. Different configurations of the bobber 20 will accommodate a variety of lures 68 of different weights or differing lengths of fishing line 64.

The primary means of adjusting the bobber 20 for balance is movement of the tube 38 within the collar 32. Moving the tube 38 forward in the collar 32 increases the weight forward of the pivot point 74 and decreases the weight aft of the pivot point 74.

FIGS. 4-6 show examples of possible positions of the tube 38 within the collar 32. FIG. 6 shows the tube 38 pushed far forward to accommodate a lightweight lure or a short length of line. FIG. 5 shows the tube 38 pulled back to balance a heavy lure or a long length of line. FIG. 4 shows the tube 38 in an intermediate position in the collar 32 to accommodate an intermediate weight. The tube 38 may be positioned within the collar 32 at any position along its length to accommodate a wide range of weights to obtain a very accurate balance. Between the extremes of position the tube is infinitely adjustable within the collar.

If additional adjustment is required, as where a heavy lure, line, or sinker are employed while fishing at greater depths, the cap 46 may be pulled back on the tube 38, as shown in FIG. 5, to extend the length of the race 44 and allow the weight 54 to assert a balancing force at a greater distance from the pivot point 74. To adjust for a lighter lure beyond moving the tube 38 forward in the collar 32 the cap 46 may be pushed inward on the tube 38 to decrease the length of the race 44. When an equilibrium position is reached the weight 54 will be adjacent the closed end 48 of the cap 46 and the lure 68 will be maintained at a substantially constant depth.

Further adjustment is possible by removing the cap and replacing the weight 54 with a weight of more or less dense material. The weight 54 may also be eliminated, in which case adjustment will be solely by positioning the tube 38 within the collar.

Figure 12:
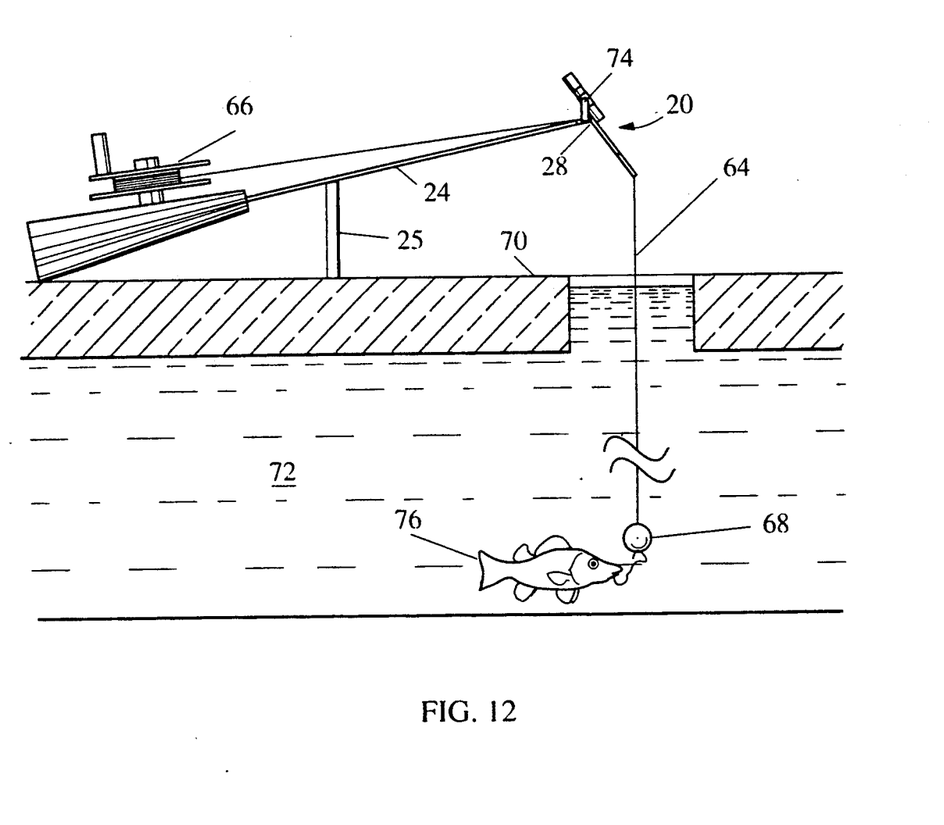
FIG. 12 is a side-elevational view of the apparatus of FIG. 1 with the hook set.

When a fish 76 takes the lure 68, a downward force is applied by the fishing line 64 to the bobber 20. This force will cause the tube 38 to tilt forward as shown in FIGS. 6 and 12. When the race 44 is inclined forwardly, the weight 54 will roll forward. The farther forward that the weight 54 rolls, the more unbalanced the bobber 20 will become. Once unbalanced, the weight 54 will roll all the way to the end of the race 44 until it strikes the closed end 40 of the tube 38. When in this unbalanced position, the hollow member 56 will point downward with the bobber 20 in a vertically inclined configuration. The bright signal coating 62 on the hollow member 56 makes it easy for an angler to observe that the bobber 20 is in its unbalanced state. The angler may then return to the fishing pole and attend to the capture of the fish. Because of the bright color of the signal coating 62, the hollow member 56 should be visible by twilight or moonlight. An audible signal is also provided to the nearby angler. The motion of the weight 54 rolling in the race 44 and the impact of the weight against the closed end 40 produces a faint but perceptible noise that serves to alert the angler, provided he is sufficiently close to the pole, that a fish has taken the line.

For dark nighttime fishing the bobber 20 may be modified to provide a luminescent signal to the angler. Such a modified bobber is shown in cross section in FIG. 7. The illuminated bobber 80 has a light-emitting diode 82 mounted outside the closed end 40 of the tube 38. The weight 54 of this embodiment must be fabricated of an electrically conductive material, such as copper or steel, or be coated with sufficient electrically conductive material to carry the current necessary to light the light-emiting diode 82. A battery lead 84 and a ground lead 86 pass through the closed end 40 into the interior of the tube 38. A battery 88 is located within the tube and has the appropriate current and voltage capacities to illuminate the light-emitting diode. The battery has a positive terminal 90 electrically connected to the battery lead 84 and anegative terminal 92 electrically connected to a negative contact 94. A positive contact 96 is electrically connected to the ground lead 86 and is positioned within the tube spaced across the diameter of the tube from the negative contact 94. The contacts 94, 96 are fixedly positioned within the tube so that when the weight 54 rolls in the race 44 to its closest proximity to the closed end 40 the electrically conductive weight 54 will touch both contacts 94, 96, completing an electrical circuit and lighting the diode 82. In the illuminated bobber 80, when a fish tugs on the line, unbalancing the bobber 80, the weight will roll forward to the closed end 40 of the tube causing an electrical connection and lighting the light-emitting diode. The light of the diode 82 serves as a visual signal to the angler that a fish has taken the line.

An alternative embodiment of the bobber of this invention is shown in FIGS. 8-11 and 13. The flexible bobber 100 has a cylindrical attachment tube 102 adapted for attachment to the tip of a fishing pole 28 with an adhesive such as tape 104. The tape 104 may be duct tape, electrician's tape, shrink tape or any other suitably adhesive and water-resistant tape. The attachment tube 102 is attached to the fishing pole 24 with a portion 108 extending outwardly beyond the end of the tip 28 of the pole. A cylindrical flexible tube 106 is snugly fitted over this extending portion 108. The flexible tube 106 may be fabricated of natural or synthetic rubber or any appropriately flexible material. A rigid cylindrical line tube 110 of substantially the same diameter as the attachment tube 102 is snugly fitted within the flexible tube 106 in spaced relation to the attachment tube. The resilience of the flexible tube 106 allows the adjustable positioning of the line tube so as to be in substantial alignment with the attachment tube 102 when the flexible tube 106 is undeflected. The line tube 110 has a coating of bright coloring 112 which may be in the form of a fluorescent strip of adhesive tape, an enamel coating, or a painted or sprayed-on coating of paint. The attachment tube 102, the flexible tube 106, and the line tube 110 all have an inner diameter that will allow the unrestricted threading of the fishing line through the tubes.

Figure 11:
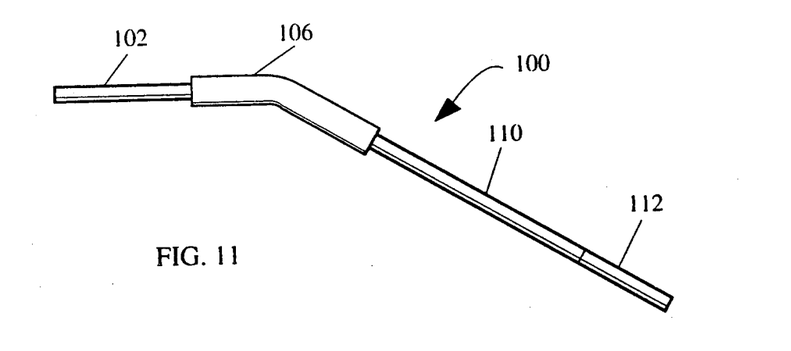
FIG. 11 is a side-elevational view of the bobber of FIG. 9 in its flexed position.
Figure 13:
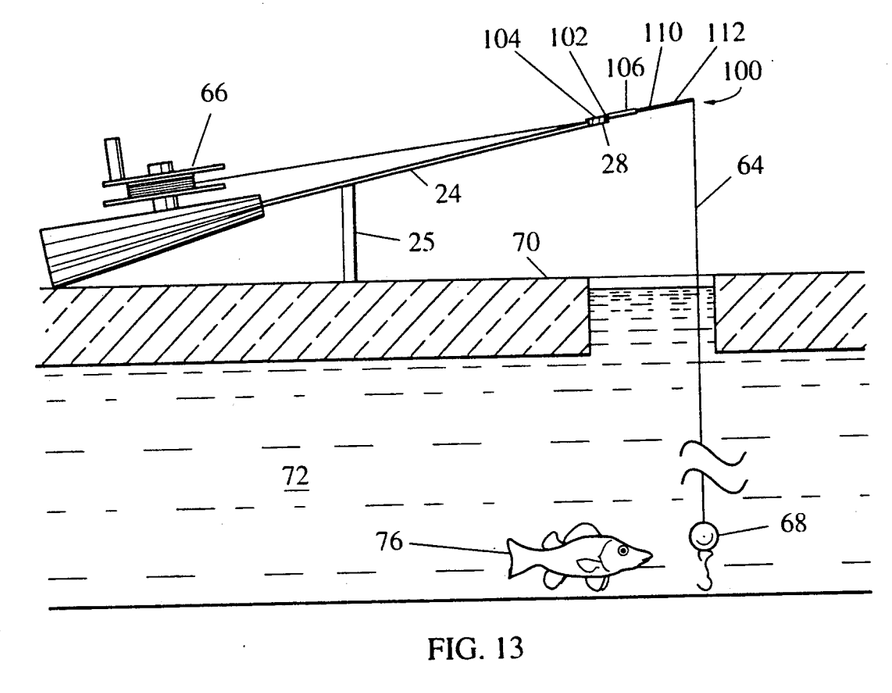
FIG. 13 is a side-elevational view of the bobber of FIG. 7 mounted on a fishing pole with the line with attached lure extending into the water through a hole in the ice shown in section.

The bobber 100 is mounted on the fishing pole 24, as shown in FIG. 13, and the fishing line 64 is threaded through the tubes 102, 106, 110. A lure 68 is attached to the end of the line and lowered into the water. When a fish takes hold of the lure 68, it will assert a downward force on the line with the result that the line tube 110 will be pulled downward. The flexible tube 106 allows the line tube 110 to rotate about the end of the attachment tube 102 until it is in a roughly vertical position as shown in FIG. 11. This attitude of the line tube 110 serves to signal visually to the angler that a fish has taken the lure 68. Depending on the weight of the lure and the fishing line, a flexible tube 106 of greater or lesser stiffness may be used so that the line tube 110 remains substantially undeflected until a fish bites. When changing lures, the angler may simply replace one flexible tube with another of the desired stiffness characteristics.

It should be noted that the rigid parts of the bobber may be fabricated of metal such as brass, steel, aluminium, or zinc; or of a suitable plastic material. The support 22 may be fabricated with only one, suitably rigid, upright member, instead of the two upright members 30 of the preferred embodiment. Furthermore, if desired the weight 54 and cap 46 may be omitted and the tube 38 fabricated as a solid or hollow cylindrical balance member. The adjustable balance of the bobber would then be achieved entirely by moving the cylinder within the collar 32.

Although the cylindrical shape of the bobber facilitates steadiness of the bobber 220 in windy conditions, the tubular assembly may have an exterior profile that is not circular, so long as it has a portion of a constant exterior profile to allow the slidable adjustment of the tubular assembly within the collar. The collar as well can be other than a cylinder so long as its interior profile matches the exterior profile of the portion of the elongated balance member or tubular assembly.

The support may also be adapted to be screwed to an upwardly extending line guide attached to the tip of the pole. It should also be noted that the pivot point 74 may be located at any desired position perpendicular to the axis of the collar and the tube—either beneath the tube, in the middle of the tube as shown, or above the tube.

Although the weight 54 has been illustrated as spherical, a cylindrical or bullet-shaped weight may also be employed. Such a weight would slide rather than roll within the tube 38 of the bobber. To facilitate the sliding the weight may be made of a low friction material or the weight or the race 44 may be coated with a low-friction material such as Teflon.

Figure 14:
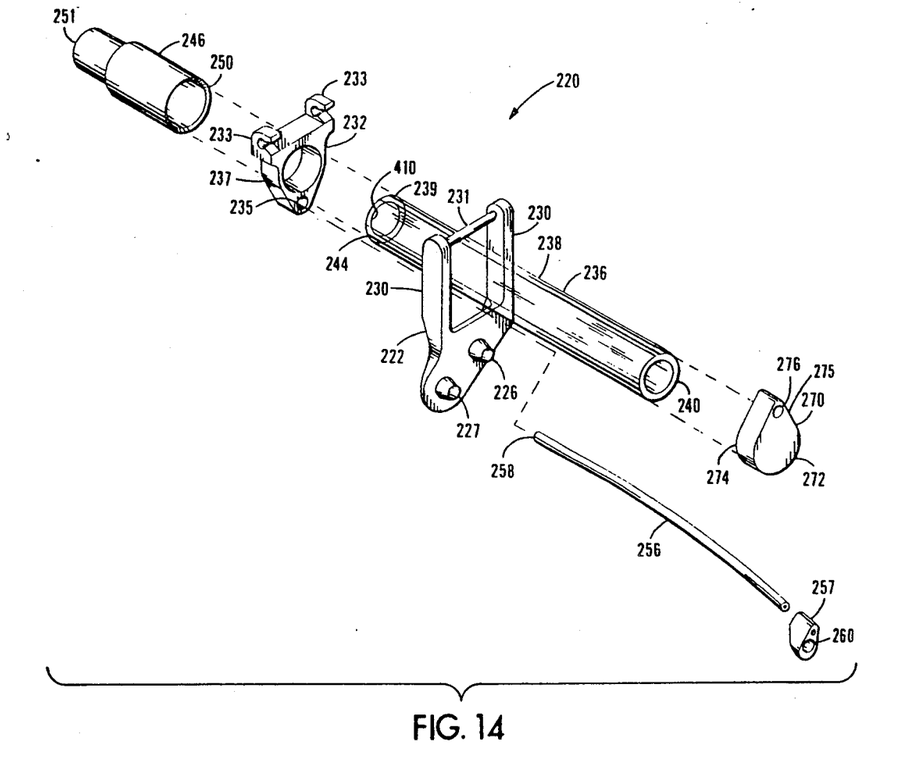
FIG. 14 is an exploded isometric view of an alternative bobber of this invention having a transparent tube.
Figure 15:
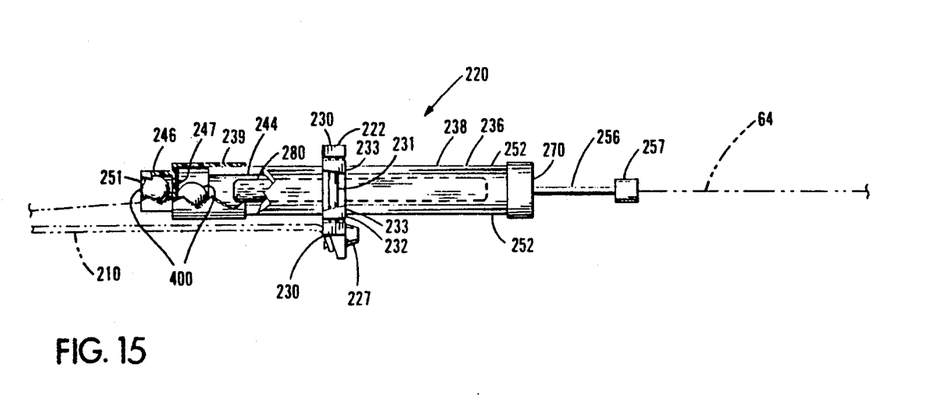
FIG. 15 is a top plan view of the bobber of FIG. 14 mounted offset on a pole.
Figures 16, 17, 18:
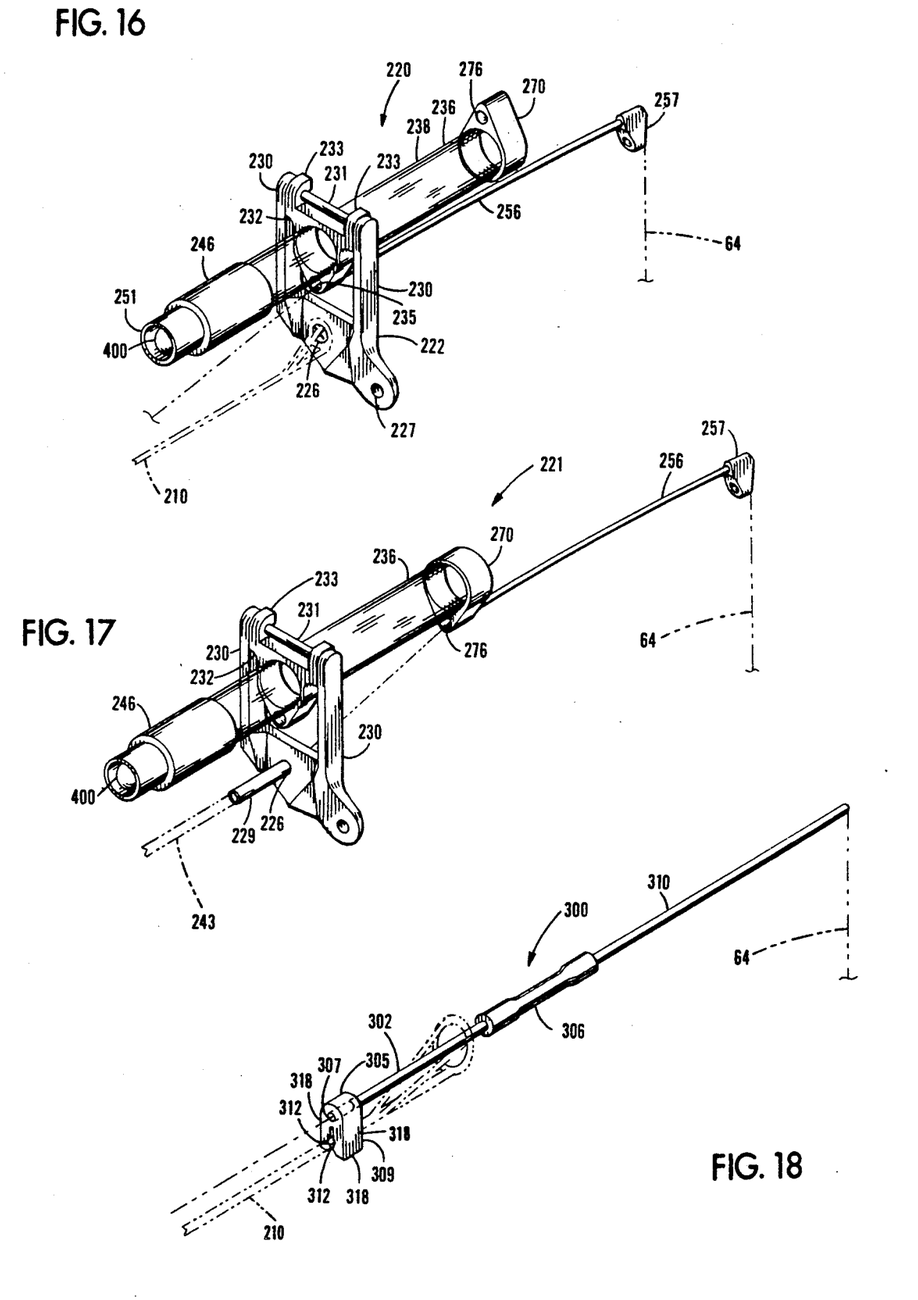
FIG. 16 is a rear isometric view of the bobber of FIG. 14 mounted on a guided pole.
FIG. 17 is a rear isometric view of the bobber of FIG. 14 mounted on a hollow pole.
FIG. 18 is a rear isometric view of an alternative bobber of this invention having a length of flexible tubing and mounted to a guided pole.

Two alternative embodiments 220, 221 of the bobber of this invention are shown in FIGS. 14, 15, 16 and 17. The guided pole bobber 220 and the hole pole bobber 221 are economically formed of molded and extruded plastic parts. The bobber 220 as shown in FIG. 14 has a support 222 for attachment of the bobber 220 to a conventional fishing pole 24. The support 222 has tipmount holes 226, 227 for the screw attachment of the support to the tip 28 of the fishing pole 24. For upper guided poles, as shown in FIG. 16, there is a centered tip mount hole 226. For lower guided poles, as shown in FIG. 15, there is an off-center tip mount hole 227. For hollow pole fishing poles, a short tube 229 is placed in the center tip mount hole 226. Two upright members 230 extend upwardly from the support 222 and are molded integrally with the support. A connecting rod 231 extends between the members 230. A plastic collar 232 has two upwardly extending hooks 233 which snap into a pivotal engagement with the connecting rod 231 to pivotally mount the collar to the rod. The collar has a lower protrusion 237 with a hole 235 beneath the connecting hooks which accepts a line-receiving tube 256. By spacing the axis of rotation above the balance member, the bobber is less sensitive to minor extraneous disturbances.

The bobber 220 has an elongated balance member 236 with a portion having an unvarying exterior profile. The balance member 236 is comprised of a cylindrical tube 238 fitted with caps 246, 270 and is slidably an adjustably positionable within the collar 232. The outer diameter of the tube 238 is such so as to permit adjustable but snug positioning of the tube 238 within the collar 232. The tube 238 of the balance member 236 has an open end 239 which faces toward the tip of the fishing pole and an open end 240 which faces away from the tip. As best shown in FIG. 15, the hollow interior of the tube 238 defines an internal cylindrical cavity 410 which acts as a cylindrical linear raceway 244 for a rolling weight 400.

A rear-end tubular cylindrical cap 246 has a rear open compartment 251 and a forward open compartment 250 which are separated by a wall 247. The inner diameter of the forward compartment of the cap is dimensioned so that the rear end tubular cap 246 may be adjustably positioned on the open end 239 of the tube 238. The rear-end tubular cap 246 and the tube 238 form a partially closed tubular assembly 252 of adjustable length. The rear open compartment 251 of the rear-end tubular cap 246 has a diameter smaller than the forward compartment 250 of the cap but is sufficient to accommodate a split shot 400. The forward open compartment 250 of the cap is also large enough to accommodate a split shot 400. The split shot 400 can be added to counterbalance a heavier lure. A series of rear end tubular caps 246 each containing a split shot 400 may be attached by coupling the forward open compartment 250 of one with the rear end open compartment 251 of another to create greater weight for balancing heavier lures.

A front-end tubular cap 270 with a closed end 272 and an open end 274 fits snugly and removably over the tube 238 so that the closed end 272 of the cap 270 closes the open end 240 of the tube 238. The rear-end cap 246, the tube 238, and the front-end cap 270 together form a closed tubular assembly 252 of adjustable length. The front-end cap 270 has a protrusion 275 with portions defining a cylindrical hole 276. A chemically luminescent glow stick 280 may be placed in the tubular assembly 252 or a dense, substantially spherical weight 54 may run in the race 244 of the tubular assembly 252.

The length of the tubular assembly 252 is adjusted by drawing the rear end tubular cap 246 backwards along the tube 238. The race 244 extends partially into the cylindrical interior of the cap 246, limited by the wall 247 of the rear-end tubular cap 246.

As shown in FIG. 16, a hollow protruding cylindrical member 256 is inserted into the collar hole 235 beneath the front-end tubular cap 270 and extends from the balance member. The hollow member 256 is of a smaller diameter than the tube 238 and has a central cavity 258 adapted to receive a centrally threaded fishing line 64. The rigid hollow cylindrical member 256 has a guide end cap 257 which is engaged to one end of the member 256 in press fit relation. The guide end cap 257 has a hole 260 which may alternatively receive the threaded fishing line 64.

Depending on whether a hollow pole 243 or a guided pole 210 is used, the hollow member 256 is positioned in different locations. For use on a guided pole 210, as shown in FIGS. 15 and 16, the hollow member 256 extends outward a specified distance from the collar hole 235 which may be any desirable length but is preferably on the order of 2–4 inches.

The cylindrical tube 238 is preferably fabricated of a transparent fluorescent plastic for visibility and to provide a visual signal to the angler that a fish has taken the line. A glow stick 280 may be placed within the transparent tube 238 to produce an additional visual signal for night fishing. This embodiment may be used with a guided pole 221 or with a hollow pole 243. The rigid hollow cylindrical member may be fabricated of a brightly colored plastic or have a fluorescent coating 262 applied to it to increase its visibility. The bobber 220 may be made of all plastic materials or a combination of plastic and metal materials.

As shown in FIG. 17, a bobber 221 utilizing all the components of the bobber 220 may be utilized with a hollow pole 243. A short tube 229 is inserted into the center tip mount hole 226 at the rear of the support 222. The rigid hollow cylindrical member 256 is inserted in the hole 276 in the front end tubular cap 270. The hollow pole bobber 221 allows the fishing line 64 to be threaded through the short tube 229, through the hole 226 and out the hollow cylindrical member 256 into the water.

Manufacturing and marketing costs are thus kept to a minimum by producing a bobber, which, by the insertion of a single additional part, may be converted from guided pole to hollow pole use.

An additional alternative embodiment is shown in FIG. 18. The flexible bobber 300 has a cylindrical attachment tube 302 adapted for attachment to the tip of the fishing pole 28 with a clip 305. The clip 305 has an aperture 307 for insertion of the cylindrical attachment tube 302 and a clamping device 309 for receiving the upper or lower end of a guided fishing pole 210. The clamping device 309 has two parallel spaced projections 318, each bearing a corresponding recess 312 to accommodate the rod-like end of a fishing pole. The cylindrical attachment tube 302 is inserted through the upper or lower end guide. A flexible tube 306 is snugly fitted to the cylindrical attachment tube 302. The flexible tube 306 may be fabricated of natural or synthetic rubber or any other appropriate flexible material. A rigid line tube 310 of substantially the same diameter as the attachment tube 302 is snugly fitted within the flexible tube 306. The resilience of the flexible tube 306 allows the adjustable positioning of the line tube 310 so as to be in substantial alignment with the attachment tube 302 when the flexible tube 306 is undeflected. The line tube 310 may have a coating of bright coloring which may be in the form of a fluorescent strip of adhesive tape, an enamel coating, paint coating or the line tube 310 may be made of a colored plastic. The attachment tube 302, the flexible tube 306, and the line tube 310 all have an inner diameter that will allow the unrestricted threading of the fishing line 64 through the tubes. For a hollow pole 243, the cylindrical attachment tube 310 may be directly placed on the end of the pole or glued or taped in place if necessary.

The flexible bobber 300 is advantageously employed for pole fishing when the pole is hand held. Because of the axial symmetry of the bobber 300, the angler does not need to be covered about the orientation of the pole, as the bobber will operate effectively throughout a full 360 degree rotation of the pole 210.

Figure 19:
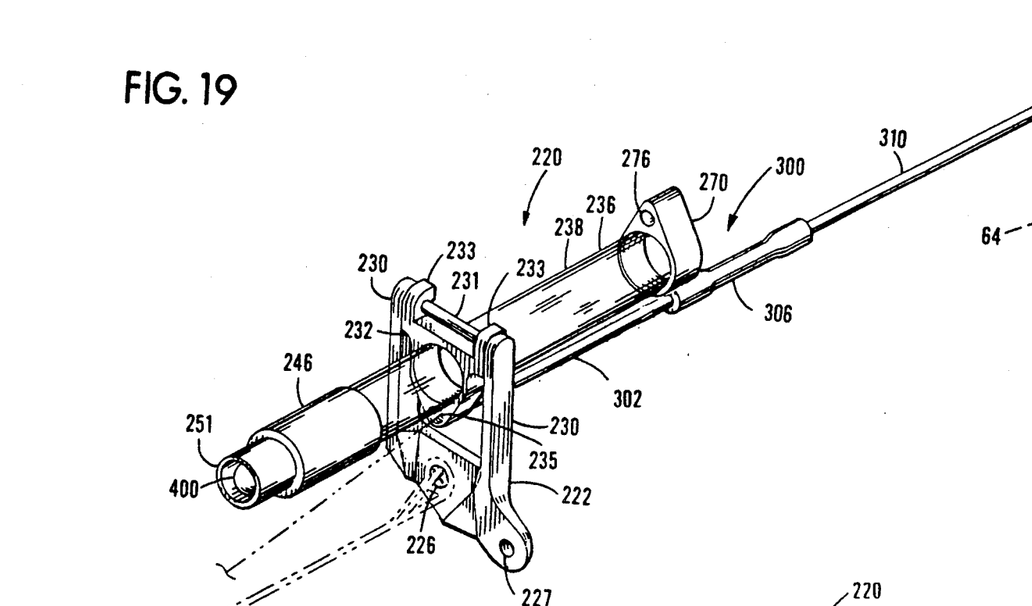
FIG. 19 is an isometric view of the bobber of FIG. 18 engaged with the bobber of FIG. 14 to form a compound bobber.

As shown in FIG. 19, the flexible bobber 300 may be engaged with the bobber 220 to form a compound bobber with a protruding member that is itself flexible and which provides a more dramatic contrast in appearance between the set and tripped apparatus. By removing the clip 305 and inserting the attachment tube 302 within the collar 232, the bobber is easily and rapidly attached to the bobber 220.

Figure 7:
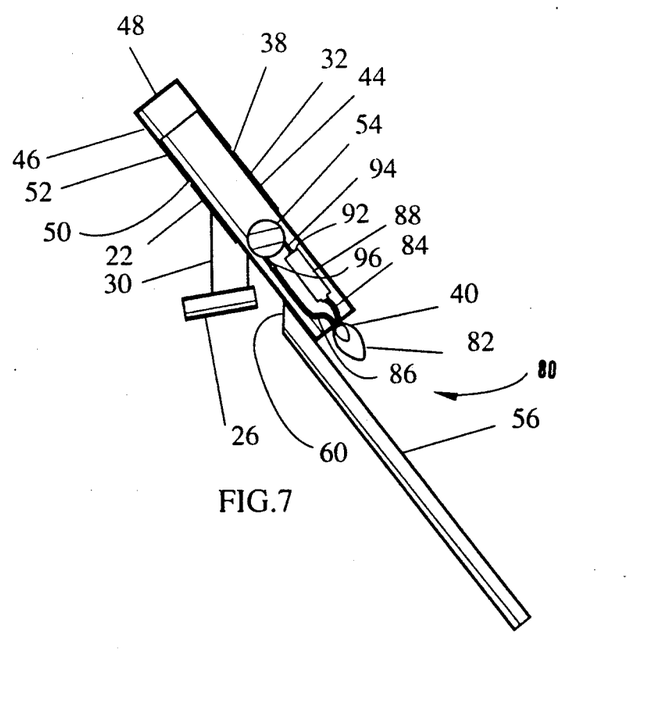
FIG. 7 is a cross-sectional view of a bobber of this invention with a light-signalling attachment in the signal position.
Figure 8:
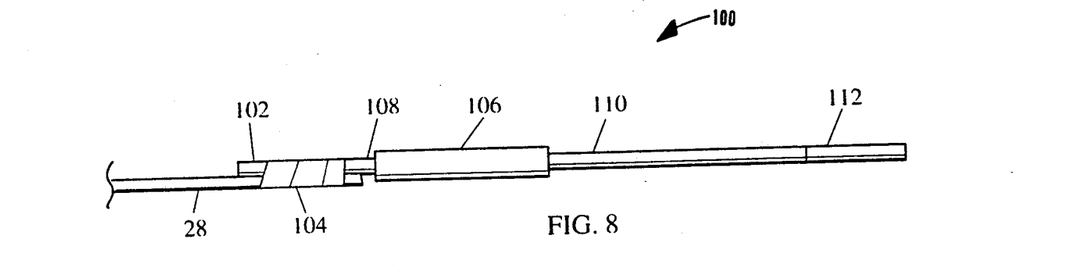
FIG. 8 is a fragmentary side-elevational view of a second embodiment of the bobber of this invention attached to a fishing pole.
Figure 9:
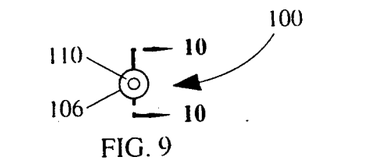
FIG. 9 is a front elevational view of the bobber of FIG. 8.
Figure 10:
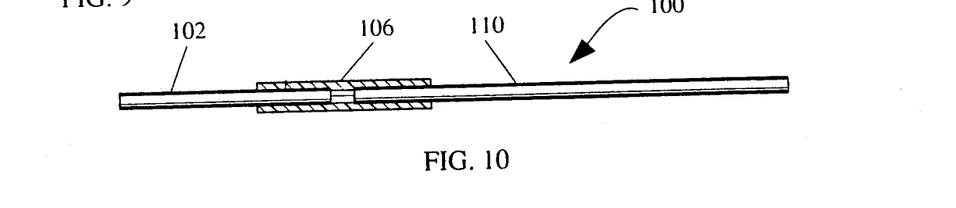
FIG. 10 is a cross-sectional view of the bobber of FIG. 9 taken along section line 10—10.
Figure 20:
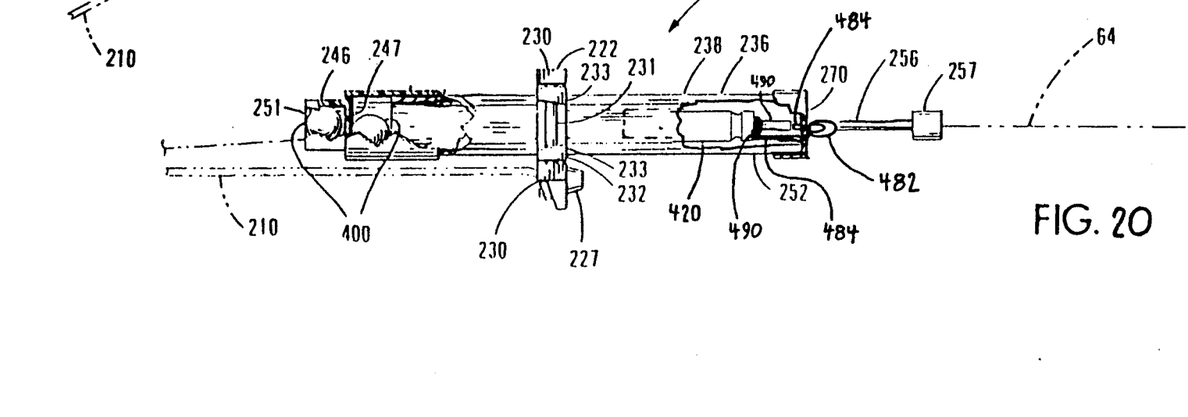
FIG. 20 is a top plan view of a bobber with a slidable battery and light.

Alternatively, as shown in FIG. 20, a cylindrical battery 420 such as the BR435, 3 volt battery distributed by FUJI-TOKI Co., LTD. may be inserted in the cylindrical cavity of the balance tube, and, similarly to the bobber 80 shown in FIG. 7, a light emitting diode 482 may be provided by attaching the diode 482 to the front end cap 270 with two contacts 484 which extend into the interior of the tube. When the bobber is unbalanced the battery terminals 490 will contact the diode contacts 484 and provide a visual signal.

It is further understood that the invention is not confined to the particular construction and arrangement of parts herein illustrated and described, but embraces such modified forms thereof as come within the scope of the following claims.

I claim:

1. A bobber for a fishing pole with a tip comprising:
   a) a support adapted for snug attachment to the tip of the fishing pole and having at least one upright member;
   b) an elongate balance member having portions defining an internal cavity and having a portion of constant exterior profile wherein the internal cavity is adapted to receive a weight therein such that the weight is free to move to balance the balance member in a substantially horizontal position or to unbalance the balance member so that it assumes an inclined position;
   c) a collar pivotally mounted perpendicular to its axis on the upright member and slidably engaging the portion of the elongated balance member and retaining the balance member in position; and
   d) a hollow member adapted to receive a centrally threaded fishing line and attached beneath the balance member wherein the balance member is slidably positionable within the collar so as to adjustably balance lures of varying weights suspended at various depths in the water and the balance member and hollow member are adapted to incline downwardly when a fish applies a downward force to the fishing line to signal a user of the presence of the fish.

2. The device of claim 1 further comprising a fishing pole with a tip, wherein the bobber is fixedly attached to the tip.

3. The bobber of claim 1 further comprising a brilliantly colored coating applied to the hollow member.

4. A bobber for a fishing pole with a tip comprising:
   a) a support adapted for snug attachment to the tip of the fishing pole and having at least one upright member;
   b) a collar pivotally mounted perpendicular to its axis on the upright member;
   c) an elongate balance member having a portion of constant exterior profile wherein the balance member is a tube having a closed end and an open end and adjustably positioned concentrically within the collar wherein the collar slidably engages the portion of the elongated balance member and retains the balance member in position; further comprising:
   d) a tubular cap with a closed end fit snugly and adjustably over the open end of the tube to form a closed tubular assembly with an internal cylindrical cavity of adjustable length;
   e) a weight located within the cavity of the assembly and free to move therein to balance the assembly in a substantially horizontal position or to unbalance the assembly so that it assumes a vertically inclined position; and
   f) a hollow cylindrical member adapted to receive a centrally threaded fishing line and attached beneath the balance member wherein the balance member is slidably positionable with the collar so as to adjustably balance lures of varying weights suspended at various depths in the water and the balance member and hollow cylindrical member are adapted to incline downwardly when a fish applies a downward force to the fishing line to signal a user of the presence of the fish.

5. A bobber for a fishing pole with a tip comprising:
   a) a support adapted for snug attachment to the tip of the fishing pole and having at least one upright member;
   b) a collar pivotally mounted perpendicular to its axis on the upright member;
   c) an elongate balance member having a portion of constant exterior profile wherein the balance member is a tube having a closed end and an open end and adjustably positioned concentrically within the collar wherein the collar slidably engages the portion of the elongated balance member and retains the balance member in position;
   d) a tubular cap with a closed end fit snugly and adjustably over the open end of the tube to form a closed tubular assembly with an internal cylindrical cavity of adjustable length;
   e) a weight located within the cavity of the assembly and free to move therein to balance the assembly in a substantially horizontal position or to unbalance the assembly so that it assumes a vertically inclined position;
   f) a hollow cylindrical member adapted to receive a centrally threaded fishing line and attached beneath the balance member wherein the balance member is slidably positionable within the collar so as to adjustably balance lures of varying weights suspended at various depths in the water and the balance member and hollow cylindrical member are adapted to incline downwardly when a fish applies a downward force to the fishing line to signal a user of the presence of the fish;
   h) a light-emitting diode mounted outside the closed end of the tube with two leads passing through the closed end into the interior of the tube;
   i) a battery with first and second terminals with the first terminal electrically connected to one of the leads of the diode;
   j) wherein the weight is electrically conductive; and
   k) a first contact electrically connected to the second terminal of the battery and a second contact electrically connected to the second lead of the diode, the two terminals positioned in the tube so that when the weight is at its closest proximity to the closed end of the tube the weight will touch both contacts, completing an electrical circuit and lighting the diode.

6. A bobber for a fishing pole with a tip comprising:
   a) a support adapted for snug attachment to the tip of the fishing pole and having two upright opposing spaced members;
   b) an annular collar, pivotally mounted perpendicular to its axis between the upright members of the support;
   c) a cylindrical tube having a closed end and an open end and adjustably positionable concentrically within the collar;
   d) a tubular cap with a closed end fit snugly and adjustably over the open end of the tube to form a closed tubular assembly with an internal cylindrical cavity of adjustable length;
   e) a substantially spherical weight located within the cavity of the assembly and free to move therein to balance the assembly in a substantially horizontal position or to unbalance the assembly so that it assumes a vertically inclined position; and f) a rigid hollow cylindrical member adapted to receive a centrally threaded fishing line and attached to the tube beneath the closed end, wherein the tubular assembly is slidably positionable within the collar so as to adjustably balance lures of varying weights suspended at various depths within the water and the tubular assembly and rigid cylindrical member are adapted to incline downwardly when a fish applies a downward force to the fishing line to signal a user of the presence of the fish.

7. A bobber for a fishing pole with a tip comprising:
a) a support adapted for attachment to the tip of the fishing pole and having two upright members and a rod extending between the upright members;
b) an elongated balance member having a portion of constant exterior profile;
c) a collar having at least one upwardly extending hook member, the collar having portions defining a hole, the collar being pivotally mounted on the rod of the support by the collar hook member and slidably engaging the elongated balance member and retaining the balance member in position; and
d) a protruding member adapted to receiving a threaded fishing line and extending from the balance member, wherein the balance member is engaged within the collar hole and is slidably positionable within the collar to adjustably balance lures of varying weights suspended at various depths in the water and the balance member and the protruding member are adapted to incline downwardly when a fish applies a downward force to the fishing line to signal a user of the presence of the fish.

8. The bobber of claim 7 wherein the protruding member is hollow and adapted to receive a fishing line threaded therethrough.

9. The bobber of claim 7 wherein the support has portions defining a fastener hole for attachment to a guided pole.

10. The bobber of claim 7 wherein the support has portions defining a through hole and a rigid tube extends from the through hole and is adapted to amount to a hollow pole, and wherein the protruding member is mounted beneath the balance member such that a fishing line may extend through the tube, the through hole, and through portions of the protruding member.

11. The bobber of claim 7 wherein the protruding member has an attachment having a through hole for receiving a fishing line.

12. The bobber of claim 7 wherein the balance member comprises a cylindrical semi-transparent tube positioned concentrically within the collar and further comprising a chemically luminescent glow stick inserted within the balance member to indicate the inclination of the balance member in low ambient light conditions.

13. The bobber of claim 7 further comprising a rear-end cap attached to the balance member which has two compartments adapted to receive weights to counterbalance heavier fishing lures.

14. The bobber of claim 7 wherein the balance member comprises:
a) a tube having a first open end disposed toward the fishing pole and a second open end disposed away from the fishing pole;
b) a rear-end tubular cap adjustably positioned over the first open end; and
c) a front-end cap fitted over the second open end, the capped ends and the tube forming a closed tubular assembly of adjustable length with an internal cylindrical cavity which is adapted to receive a weight which is free to move therein to balance the assembly in a substantially horizontal position or to unbalance the assembly so that it assumes a vertically inclined position.

15. The bobber of claim 14 further comprising:
a) a light-emitting diode mounted outside the front end cap on the tube with two contacts extending through the front end cap into the interior of the tube; and
b) a weight comprising a battery with first and second terminals located within the internal cavity such that when the battery is at its closest proximity to the end cap the battery will touch both contacts, completing an electrical circuit and lighting the diode.

16. The bobber of claim 14 wherein the rear-end cap has two compartments to which a weight can be added to counterbalance heavier fishing lures.

17. The bobber of claim 14 wherein the protruding member is attached to the front end cap.

18. The bobber of claim 7 wherein the protruding member is attached to the collar beneath the balance member.

19. An adjustable balance bobber for a fishing pole with a tip comprising:
a) a support adapted for attachment to the tip of the fishing pole and having two upright members;
b) an elongated balance member having a cylindrical tubular portion, the tubular portion defining an interior race adapted to receive a weight which is free to move therein to balance the balance member in a substantially horizontal position or to unbalance the assembly so that it assumes a vertically inclined position;
c) a collar pivotally mounted between the upright members of the support and slidably engaging the cylindrical tubular portion of the elongated balance member and retaining the balance member in position; and
d) a protruding member which extends from the balance member and which is adapted to receiving a threaded fishing line, wherein the balance member is engaged within the collar hole and is slidably positionable within the collar to adjustably balance lures of varying weights suspended at various depths in the water and the balance member and the protruding member are adapted to incline downwardly when a fish applies a downward force to the fishing line to signal a user of the presence of the fish.

20. The bobber of claim 19 wherein the balance member comprises a cylindrical semi-transparent tube positioned concentrically within the collar and further comprising a chemically luminescent glow stick inserted within the balance member to indicate the inclination of the balance member in low ambient light conditions.

21. The bobber of claim 19 wherein the support has portions defining a through hole and a rigid tube extends from the through hole and is adapted to mount to a hollow pole, and wherein the cylindrical member is mounted beneath the balance member such that a fishing line may extend through the tube, the through hole, and through portions of the cylindrical member.

22. The bobber of claim 19 further comprising:
a) a rigid cylindrical attachment tube engaged with the collar;
b) an elastic flexible cylindrical tube snugly fitted over a portion of the attachment tube; and
c) a rigid cylindrical line tube snugly fitted within the flexible tube.

* * * * *

UNITED STATES PATENT AND TRADEMARK OFFICE
CERTIFICATE OF CORRECTION

PATENT NO.   : 5,115,590

DATED        : May 26, 1992

INVENTOR(S)  : Larson

It is certified that error appears in the above-identified patent and that said Letters Patent is hereby corrected as shown below:

Column 11, line 67, "with" should be --within--.

Column 13, line 46, "amount" should be --mount--.

Signed and Sealed this

Twentieth Day of July, 1993

Attest:

MICHAEL K. KIRK

Attesting Officer     Acting Commissioner of Patents and Trademarks